United States Patent [19]
Mogi et al.

[11] Patent Number: 4,843,289
[45] Date of Patent: Jun. 27, 1989

[54] DIGITAL CONTROL BUS SYSTEM

[75] Inventors: Takao Mogi; Keiji Yuzawa; Yoshinori Komiya; Masayuki Suematsu; Fujio Tagami, all of Tokyo, Japan

[73] Assignee: Sony Corp., Tokyo, Japan

[21] Appl. No.: 161,316

[22] Filed: Feb. 23, 1988

Related U.S. Application Data

[63] Continuation of Ser. No. 881,326, Jul. 2, 1986, abandoned.

[30] Foreign Application Priority Data

Jul. 20, 1985 [JP] Japan ............................ 60-161004

[51] Int. Cl.$^4$ ............................................. H04Q 3/00
[52] U.S. Cl. ................................... 318/600; 364/133; 364/140; 340/825
[58] Field of Search ......................... 318/600; 360/33.1; 364/131, 133, 134, 140, 141, 187; 371/8; 358/907, 908; 340/825

[56] References Cited

U.S. PATENT DOCUMENTS

| | | | |
|---|---|---|---|
| 3,886,318 | 5/1975 | Charransol | 371/8 X |
| 3,984,819 | 10/1976 | Anderson . | |
| 4,011,542 | 3/1977 | Baichtal | 371/8 X |
| 4,017,828 | 4/1977 | Watanabe | 371/8 |
| 4,076,961 | 2/1978 | Holsinger et al. | 371/8 X |
| 4,159,470 | 6/1979 | Strouny | 371/8 X |
| 4,212,057 | 7/1980 | Devlin | 364/134 X |
| 4,228,496 | 10/1980 | Katzman | 364/187 X |
| 4,231,015 | 10/1980 | Union | 364/187 X |
| 4,232,206 | 11/1980 | Tooyama | 371/8 |
| 4,276,593 | 6/1981 | Hansen | 364/187 X |
| 4,319,338 | 3/1982 | Grudowski | 364/131 X |
| 4,365,247 | 12/1982 | Bargeton | 371/8 X |
| 4,377,000 | 3/1983 | Staab | 364/187 X |
| 4,456,965 | 6/1984 | Graber et al. . | |
| 4,521,871 | 6/1985 | Galdun | 364/187 X |
| 4,594,709 | 6/1986 | Yasue | 371/8 |
| 4,607,365 | 8/1986 | Greig | 371/8 |
| 4,627,045 | 12/1986 | Olson | 371/8 X |
| 4,633,473 | 12/1986 | Ratchford | 371/8 X |
| 4,639,852 | 1/1987 | Motomiya | 364/187 X |
| 4,748,560 | 5/1988 | Kataoka | 371/8 X |

OTHER PUBLICATIONS

Patent Abstracts of Japan, vol. 6, No. 27, (p-102) [905], 2/17/82; JP-A-56 145 443, Pana Facom K. K., 12/11/81.
Patent Abstracts of Japan, vol. 6, No. 27, (p-102) [905], 2/17/82; JP-A-56 145 452, Pana Facom K. K. 12/11/81.
Patent Abstracts of Japan, vol. 6, No. 27, (p-102) [905], 2/17/82; JP-A-56 145 454, Pana Facom K. K., 12/11/81.

Primary Examiner—Bentsu Ro
Attorney, Agent, or Firm—Alvin Sinderbrand

[57] ABSTRACT

Digitally controllable ICs or function blocks in an electronic apparatus are connected through control bus lines, and a switch device is provided for disconnecting one of the digitally controllable ICs or function blocks from the control bus so that the control bus is not disabled when that one IC is turned off or is not occupied when the IC is operating in its internal processing mode. Therefore, communication between the remaining ICs can be maintained through the control bus.

7 Claims, 3 Drawing Sheets

DIGITAL CONTROL BUS SYSTEM

This application is a continuation of application Ser. No. 881,326 filed July 2, 1986, now abandoned.

BACKGROUND OF THE INVENTION

1. Field of the Invention

This invention relates to a digital control bus system wherein function blocks, which may include digitally controllable integrated circuits (ICs), in electronic apparatus are connected through bus lines to allow signal transmissions therebetween.

2. Description of the Prior Art

Most video/audio apparatus such as television receivers, VTRs, and tape recorders that use digitally controllable ICs employ an inner bus system. Conventional electronic apparatus having an inner bus system includes a CPU, an inner bus, and a ROM as a control block. The control program for the respective circuits is stored in the ROM. In normal operation, the program is read out by the CPU and control signals are supplied to a predetermined circuit through the inner bus so that the corresponding digitally controllable IC performs a predetermined operation. These ICs are also controllable by a keyboard or a remote controller through the CPU and the inner bus.

A conventional inner bus is described in Japanese Patent Application laid open No. 57-106262, as a two-line system consisting of a data transmission line and a clock transmission line. For example, in a conventional TV set utilizing an inner bus system, a channel selection microprocessor, a non-volatile memory for storing control data, and a signal processing IC including a video processor and an audio processor are connected through a two-line inner bus. If a channel selection command is externally supplied to the TV set, for example, from a keyboard or a remote controller, the channel selection microprocessor reads out preset data corresponding to the selected channel from the memory and transmits the preset data to the signal processing IC. The channel selection microprocessor thus performs channel selection so as to cause the TV set to receive a predetermined broadcast signal.

In another conventional combined VTR and TV set utilizing an inner bus system, a TV block and a VTR block are controlled by a keyboard/remote controller decoder of a microprocessor through an inner bus.

In the above described inner bus systems, an inner bus is commonly used in individual electronic apparatus for time division processing. In other words, the bus cannot be used for simultaneous processing. For this reason, various operational limits and inconveniences result.

In the above described TV set with a remote controller, the channel selection microprocessor and the non-volatile memory are always supplied with operating power from a sub-power source. Main operating power is supplied from a source thereof to the signal processing IC upon operation of a power ON switch in the remote commander or controller. In a remote controller standby mode, the main power is not supplied to the signal processing IC which is off or grounded and the TV set waits to receive an operation command from the remote commander.

In this standby mode or state, the common inner bus is also grounded and the channel selection microprocessor cannot access the non-volatile memory through the inner bus. For example, if the signal processing IC has a surge protection diode at an input end connected to the inner bus, the cathode of such protection diode connected to the power source is grounded, and the inner bus is also thereby grounded.

Once the remote controller standby mode is set after a power failure or other interruption of power, a "last power flag" representing the TV operation mode immediately prior to the power failure cannot be read out from a memory area at the corresponding address of the non-volatile memory. As a result, the status prior to the power failure cannot be restored.

In the combined VTR and TV set, while the TV block occupies the bus to perform internal processing, the keyboard/remote controller decoder cannot send a signal to the VTR block. In addition, the VTR block cannot use the inner bus to perform its internal processing.

The following problem is also encountered due to common use of the bus by a TV and VTR. A master controller sends both data and address signals for designating a slave device. In this case, if signal processing ICs, for example, tuner ICs, having the identical slave addresses are provided in the TV and VTR blocks, confusion will occur.

OBJECTS AND SUMMARY OF THE INVENTION

It is, therefore, an object of the present invention to improve utilization efficiency of the inner bus system while avoiding disabling of the inner bus.

In order to achieve the above object of the present invention, a digital control bus system for exchanging signals between plural function blocks through bus lines is provided with switch means for disconnecting a predetermined function block from the bus lines when the supply of power to that function block is turned OFF. With the foregoing arrangement, since the bus lines are not grounded, communication therethrough between the remaining function blocks can be maintained.

DETAILED DESCRIPTION OF THE PREFERRED EMBODIMENTS

Figure 1:
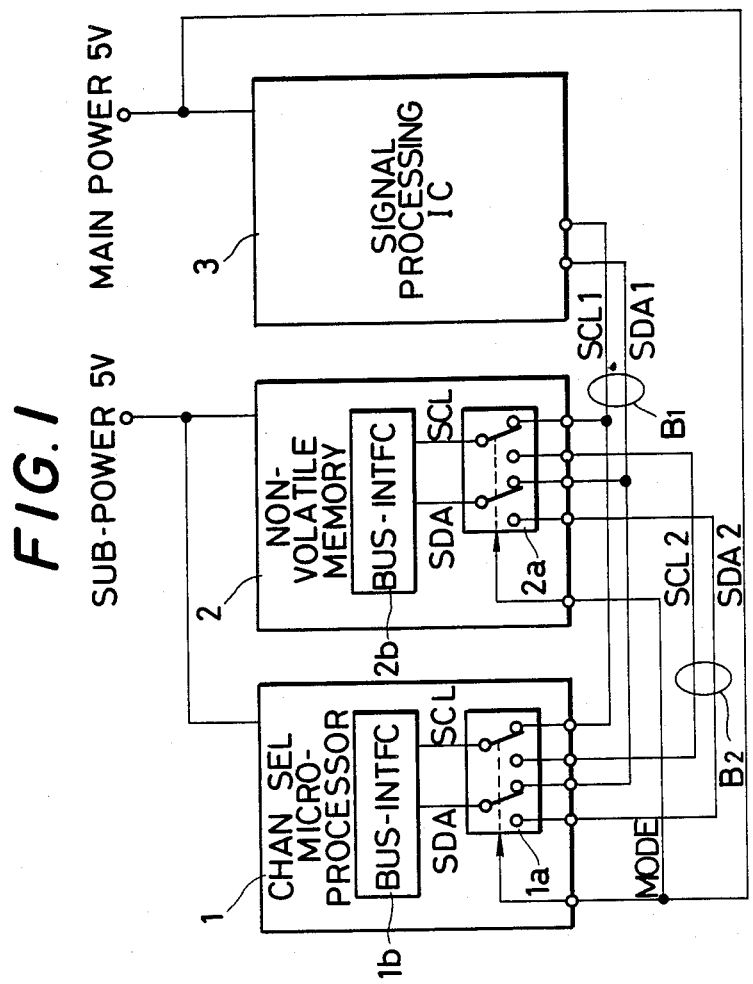
FIG. 1 is a block diagram of an inner bus system TV set according to an embodiment of the present invention.

Referring to FIG. 1, it will be seen that an inner bus system TV set according to an embodiment of the present invention is there shown to employ a double bus arrangement consisting of first and second buses B1 and B2. Bus B1 consists of a data/address line SDA1 and a clock line SCL1. Similarly, bus B2 consists of a data/address line SDA2 and a clock line SCL2. Bus B1 is commonly connected to a channel selection microprocessor 1, a non-volatile memory 2, and a signal processing integrated circuit IC) 3. Bus B2 is commonly connected to channel selection microprocessor 1 and non-volatile memory 2.

Bus selection switches 1a and 2a are arranged in channel selection microprocessor 1 and non-volatile memory 2, respectively. Channel selection microprocessor 1 and non-volatile memory 2 are selectively connected to either one of the buses B1 and B2 through bus interfaces (BUS-INTFCs) 1b and 2b and switches 1a and 2a.

A sub-power source of 5V is connected to channel selection microprocessor 1 and non-volatile memory 2. Signal processing IC 3 is operated from a main power source of 5 V.

When the TV set is operated for TV signal reception, a mode signal MODE representing the main power ON state is set at logic "1". In response to that mode signal, bus selection switches 1a and 2a select the first bus B1 (SDA1 and SCL1), as shown in FIG. 1. Therefore, TV signal reception is controlled through the first bus B1.

In a remote controller standby mode, the main power of 5 V is no longer supplied to signal processing IC 3 and the mode signal becomes logic "0". The channel selection microprocessor 1 and non-volatile memory 2 are supplied with the sub-power and held in the wait mode. In this case, the first bus B1 is also grounded upon power-off of the signal processing IC 3 and cannot be used.

However, bus selection switches 1a and 2a are changed-over in response to the mode signal of logic "0" so that channel selection microprocessor 1 can communicate with the non-volatile memory 2 through bus B2. Therefore, even in the standby mode, channel selection microprocessor 1 can read out data from non-volatile memory 2. For example, the "last power flag" can be read out from memory 2 upon recovery from a power failure to restore the operation status immediately prior to the power failure.

Figure 2:
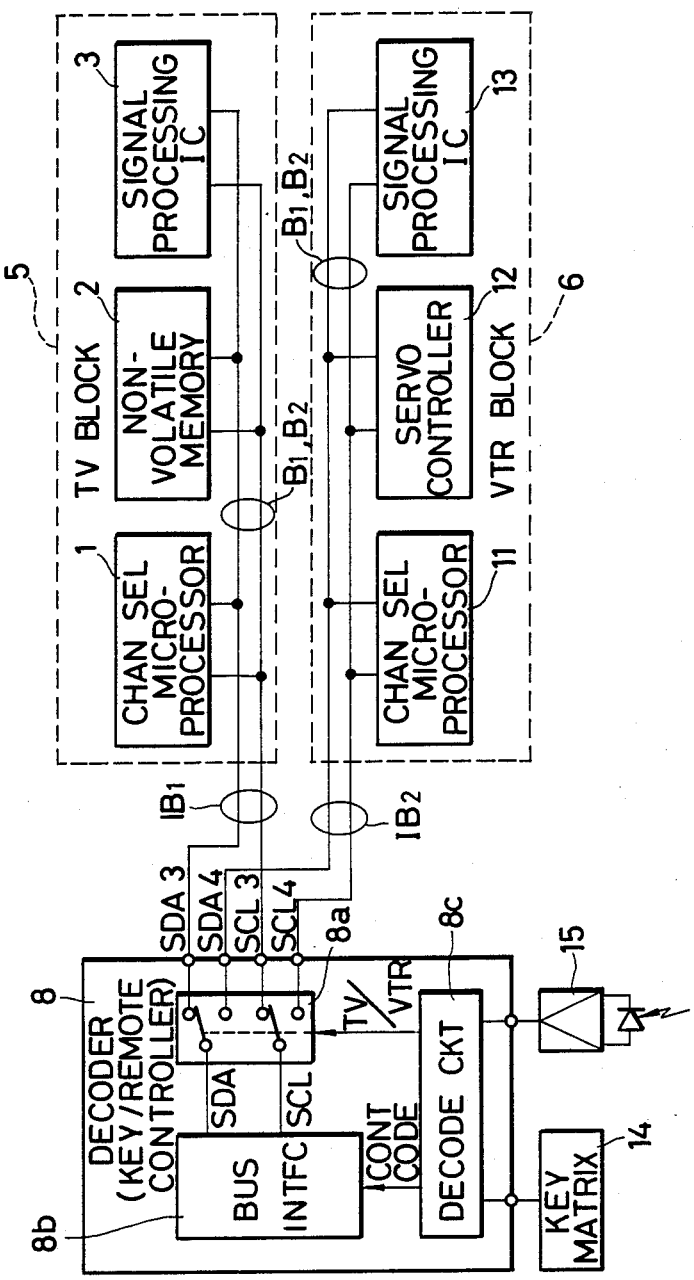
FIG. 2 is a block diagram of a combined VTR and TV according to another embodiment of the present invention.

FIG. 2 illustrates application of the present invention to a combined TV and VTR. In such combined apparatus, a TV block 5 comprises a channel selection microprocessor 1, a non-volatile memory 2, and a signal processing IC 3 in the same manner as in FIG. 1. A VTR block 6 comprises a channel selection microprocessor 11, a servo controller 12, and a signal processing IC 13.

Each of the TV and VTR blocks 5 and 6 has a double bus system consisting of buses B1 and B2 which are shown combined, but which are to be understood to be arranged in the same manner as in FIG. 1. Thus, the intrablock communication paths can be enabled even in the remote controller standby mode.

In addition, a high-order double bus system is also employed in the entire system. The bus from the key-/remote controller decoder 8 consists of a first bus IB1 for TV block 5 and a second bus IB2 for VTR block 6. Each of the buses IB1 and IB2 is branched into parallel buses B1 and B2 in each of blocks 5 and 6 in the same manner as in FIG. 1.

As shown, bus IB1 consists of a data/address line SDA3 and a clock line SCL3. Similarly, bus IB2 consists of a data/address line SDA4 and a clock line SCL4. The first and second buses IB1 and IB2 are switched by a bus selection switch 8a situated in key/remote controller decoder 8 and connected to the internal circuit in the decoder 8 through a bus interval (BUS INTFL) 8B. An operation signal (control code) from a key matrix 14 on an electronic equipment panel surface or from a remote controller receiver 15 is supplied to decoder 8 through a decode circuit 8c and bus interface 8b. At the same time, the decode circuit 8c outputs a TV/VTR mode signal upon operation of the key matrix 14 or in response to a suitable signal from remote controller receiver 15 to cause the bus selection switch 8a to select one or the other of the buses IB1 and IB2.

For example, the VTR may be operated in the play mode in the following manner: The operator uses key matrix 14 or the remote controller to set the TV set in the VTR mode. In such case, the selection switch 8a is disposed as shown to connect bus interface 8b with the first bus IB1. In this mode, the TV block 5 can receive a video RF signal. When the VTR is subsequently to be set in the playback mode, the key matrix 14 or remote controller is suitably actuated and the selection switch 8a is changed-over to connect bus interface 8b to the second bus IB2 and thus VTR block 6 is set in the playback mode.

The TV and VTR blocks 5 and 6 can be controlled by decoder 8 through the independent buses IB1 and IB2. Eve if the TV block 5 continuously occupies the bus IB1 to perform internal processing in the TV block 5, a communication path between the decoder 8 and the VTR block 6 still can be established through bus IB2. Even if ICs having identical slave addresses are used in the TV and VTR blocks 5 and 6, buses IB1 and IB2 are switched to easily identify the target slave device in each block.

Figure 3:
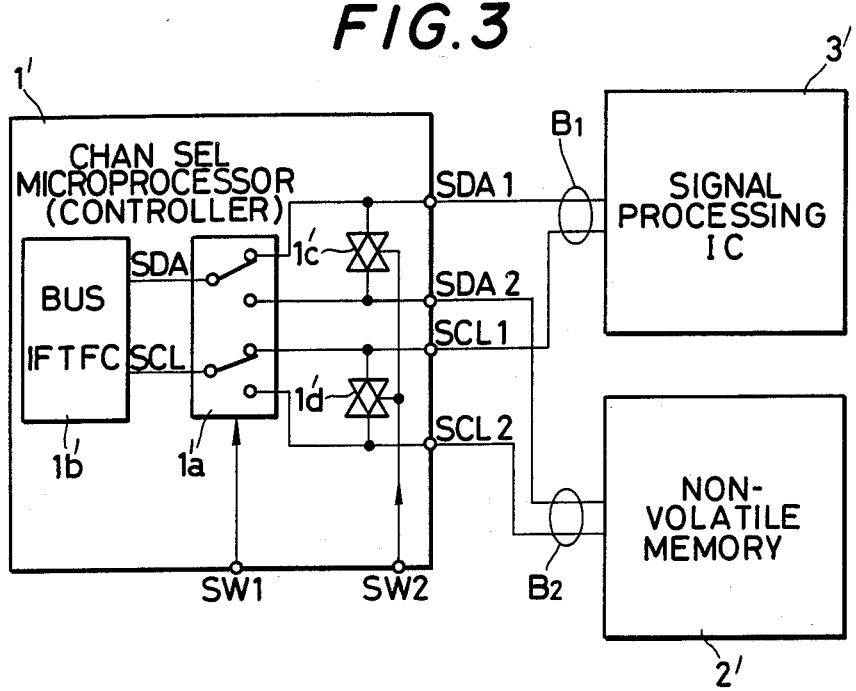
FIG. 3 is a block diagram of a bus switching system according to still another embodiment of the present invention; an FIG. 4 is a block diagram of a bus system according to still another embodiment of the present invention.

FIG. 3 shows still another embodiment of the present invention employing a bus system which is a compromise between the double bus system of FIG. 1 and the exclusive bus system of FIG. 2. In FIG. 3, an inner bus (SDA and SCL) connected to a bus interface 1'b in a channel selection microprocessor 1' is branched or selectively connected by way of a bus selection switch 1'a to first and second buses B1 and B2 which are connected to a signal processing IC 3' and a non-volatile memory 2', respectively. The bus selection switch 1'a is controlled in response to a switching signal SW1 to selectively form independent communication paths by using the buses B1 and B2 as exclusive buses for the function blocks 3' and 2', respectively. For example, the ON/OFF state of the main power source may be detected as an indication of the operation mode and to form the switching signal SW1 which is used to change-over switch 1'a and thereby disconnect bus B1 of signal processing IC 3 from the channel selection microprocessor 1' and nonvolatile memory 2'.

Bi-directional switches 1'c and 1'd are arranged to short circuit both the data/address lines SDA1 and SDA2 and both the clock lines SCL1 and SCL2 of first and second buses B1 and B2, respectively. If bi-directional switches 1'c and 1'd are turned ON in response to a switching signal SW2, data/address lines SDA1 and SDA2 are connected and clock lines SCL1 and SCL2 are connected so that buses B1 and B2 function as an integral bus which can be used as a common inner bus in the electronic equipment.

Figure 4:
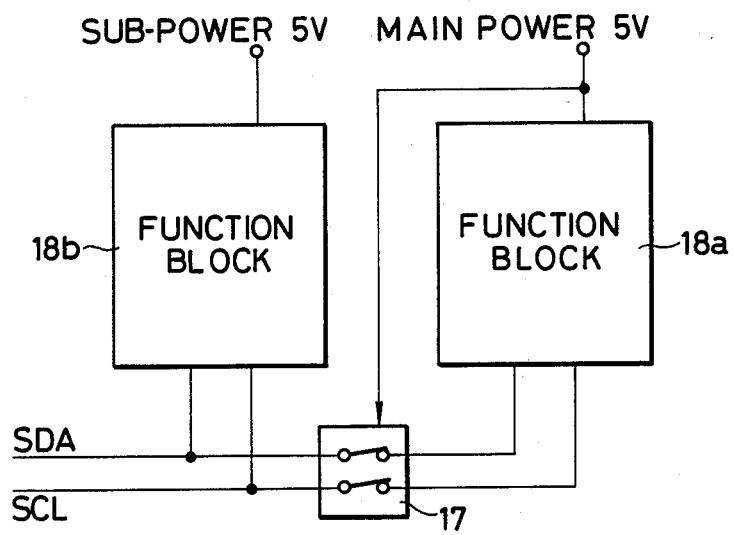

In order to disconnect the common bus line from a predetermined function block, a disconnection switch 17 may be provided according to still another embodiment, as shown on FIG. 4. For example, when the main power source of 5 V is no longer supplied to the signal processing IC of a function block 18a in the remote controller standby mode, disconnection switch 17 is automatically opened and function block 18a is thereby disconnected from the common bus lines SDA and SCL connected to another function block 18b. The disconnection switch 17 may be external of function block 18a or it may be a switching element included in function block 18a and may serve as a high impedance when the main power is turned OFF.

In addition to the embodiments described above, the invention can also be applied to an inner bus system having a timer standby function.

Generally, in accordance with the present invention as described above, when the main power source for a predetermined function block is turned OFF, such function block is disconnected from the bus line. Therefore, the bus line is not necessarily grounded in the power off state, and communication between the remaining function blocks can be maintained by way of the bus line.

Although particular embodiments of the invention have been described in detail with reference to the drawings, it is to be understood that the invention is not limited to those precise embodiments, and that various changes and modifications may be effected therein by one skilled in the art without departing from the scope or spirit of the invention as defined in the appended claims.

What is claimed is:

1. A digital control bus system for electronic apparatus including at least three function blocks, said system comprising:
   first control bus means for connecting a first group of said function blocks in parallel for transmitting data among the function blocks in said first group, said first group including at least first, second and third ones of said function blocks;
   second control bus means for connecting a second group of at least two of said function blocks exclusive of said third function block in parallel for transmitting data among the function blocks in said second group, said second group including said first and second function blocks;
   each of said first and second control bus means including a data line and a clock line;
   bus interface means included in each of said function blocks in said second group; and
   switch means including a respective switch connected between the bus interface means in each function block in said second group and said first and second control bus means for connecting each said bus interface means to a same selected one of said first and second control bus means, whereby said third function block is selectively disconnectable from data transmission to and from the function block in said second group while data transmission is permitted among the function blocks in said second group.

2. A digital control bus system as in claim 1; further comprising a main power source connected to said first and third function blocks, and wherein said switch means is controlled in response to the supplying of power from said main power source to said first function block.

3. A digital control bus system as in claim 2; wherein said switch means is further controlled to select said second control bus means in response to interruption in the supplying of power from said main power source to said third function block.

4. A digital control bus system as in claim 1; wherein said first function block includes connecting terminals connected to said first and second control bus means; and said switch means is provided in said first function block between said bus interface means and said terminals.

5. An electronic system comprising:
   a control apparatus;
   first and second electronic apparatus each respectively including at least three function blocks and a digital control bus system, each said control bus system within the respective electronic apparatus including:
   first control bus means for connecting a first group of said function blocks in parallel for transmitting data among the function blocks in said first group, said first group including at least first, second and third ones of said function blocks;
   second control bus means for connecting a second group of at least two of said function blocks exclusive of said third function block in parallel for transmitting data among the function blocks of said second group, said second group including said first and second function blocks;
   each of said first and second control bus means including a data line and a clock line;
   bus interface means included in each of said function blocks in said second group; and
   first switch means including a respective switch connected between the bus interface means in each function block in said second group and said first and second control bus means for connecting each said bus interface means to a same selected one of said first and second control bus means, wherein said third function block is selectively disconnectable from data transmission to and from the function blocks of said second group while data transmission is permitted among the function blocks in said second group;
   control bus interface means in said control apparatus; and
   control switch means in said control apparatus for selectively connecting said control bus interface means to a selected one of said first and second control bus systems.

6. An electronic system as in claim 5; wherein said control apparatus further includes additional switch means for connecting said control bus system in said first electronic apparatus with said control bus system in said second electronic apparatus.

7. An electronic system as in claim 6; wherein said control apparatus includes connecting terminals to said first and second control bus systems, and said additional switch means is connected between the control switch means and said connecting terminals of said control apparatus.

* * * * *